United States Patent
Karnam et al.

(10) Patent No.: US 12,367,113 B1
(45) Date of Patent: Jul. 22, 2025

(54) PROACTIVE AUTO-CORRECTION TO REDUCE DISPATCHES AT CUSTOMER ENVIRONMENT

(71) Applicant: Dell Products, L.P., Round Rock, TX (US)

(72) Inventors: Sirisha Karnam, Bangalore (IN); Vishnu Karrotu, Hyderabad (IN); Akash Lokesh, Bangalore (IN); Anson Thomas, Pflugerville, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/420,672

(22) Filed: Jan. 23, 2024

(51) Int. Cl.
G06F 7/00 (2006.01)
G06F 11/07 (2006.01)
G06F 11/14 (2006.01)

(52) U.S. Cl.
CPC ...... *G06F 11/1469* (2013.01); *G06F 11/0709* (2013.01); *G06F 11/079* (2013.01); *G06F 11/1464* (2013.01); *G06F 2201/84* (2013.01)

(58) Field of Classification Search
CPC ............ G06F 11/1469; G06F 11/0709; G06F 11/079; G06F 11/1464; G06F 2201/84

USPC ................................................. 707/600–899
See application file for complete search history.

(56) References Cited

U.S. PATENT DOCUMENTS

2021/0342204 A1* 11/2021 Choudhury ........... G06F 11/004

* cited by examiner

*Primary Examiner* — Isaac M Woo

(74) *Attorney, Agent, or Firm* — Amin, Turocy & Watson, LLP

(57) ABSTRACT

A system can collect system logs from a computer, and store the system logs in data storage of a cloud computing platform. The system can instruct the cloud computing platform to structure and analyze the system logs. The system can, based on the analyzing, determine a probability of a failure of a component of the computer. The system can, based on determining that a value of the probability falls within a specified range of probability values, trigger a defined action of the defined actions that comprises triggering a data backup of the computer, determine a root cause of the failure of the component, and trigger a self-healing action of the computer, wherein the self-healing action is based on the root cause of the failure of the component. The system can, after the self-healing action is performed, recover the backed up data to the computer.

20 Claims, 13 Drawing Sheets

500

```
PROACTIVE AUTO-CORRECTION TO
REDUCE DISPATCHES AT CUSTOMER
ENVIRONMENT COMPONENT 518
```

| TIME 502 | MESSAGE 504 | SERVER MODEL / DRIVE MODEL 506 | SEVERITY 508 | CATEGORY 510 | MESSAGE ID 512 | CURRENT BIOS/FW VERSION 514 | RECOMMENDED BIOS/FW VERSION 516 |
|---|---|---|---|---|---|---|---|
| dd.mm.yyyy .hh.mm.ss | Correctable memory error on DIMM XX in slot YY | R100 | Error | Audit | MEM8000 | 2.4.5 | 2.13.3 |
| dd.mm.yyyy .hh.mm.ss | DIMM degradation memory error on DIMM XX in slot YY | R110 | Error | Audit | MEM0802 | 2.2.10 | 2.6.5 |
| dd.mm.yyyy .hh.mm.ss | Memory error due to incompatible added hardware | C6000 | Warning | Audit | XXXX | XXXX | XXXX |
| dd.mm.yyyy .hh.mm.ss | Predictive drive failure with sense key error for drive XX in slot YY | R1525 | Error | Audit | XXXX | CSJ7 | CSJA |
| dd.mm.yyyy .hh.mm.ss | Bad block media error for drive XX in slot YY | C6015 | Error | Audit | XXXX | ST58 | STC |

FIG. 5

PROACTIVE AUTO-CORRECTION TO REDUCE DISPATCHES AT CUSTOMER ENVIRONMENT

BACKGROUND

Computers can comprise multiple components, which can each fail.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can deploy a microservice to a computer system. The system can collect system logs from the computer system via the microservice, and store the system logs in data storage of a cloud computing platform that is separate from the computer system. The system can instruct the cloud computing platform to structure and analyze the system logs. The system can, based on the analyzing, determine a probability of a failure of a component of the computer system. The system can, based on determining that a value of the probability falls within a specified range of probability values, wherein possible probability values are divided into ranges that correspond to defined actions, and wherein the ranges comprise the specified range, trigger a defined action of the defined actions that comprises triggering a data backup of the computer system to produce backed up data, determine a root cause of the failure of the component, and trigger a self-healing action of the computer system, wherein the self-healing action is configured to at least mitigate the failure of the component and is based on the root cause of the failure of the component. The system can, after the self-healing action is performed, recover the backed up data to the computer system.

An example method can comprise collecting, by a system comprising at least one processor, system logs from a computing device via a service deployed to the computing device, and storing the system logs in data storage of a cloud computing platform that is separate from the computing device. The method can further comprise instructing, by the system, the cloud computing platform to structure and analyze the system logs. The method can further comprise, based on the analyzing, determining, by the system, a probability of a failure of a component of the computing device. The method can further comprise, based on determining that a value of the probability falls within a first range of probability values, wherein possible probability values are divided into ranges that correspond to predefined actions, and wherein the ranges comprise the first range, initiating, by the system, a data backup of the computing device to produce backed up data, determining, by the system, a cause of the failure of the component, and triggering, by the system, an action of the computing device, wherein the action is configured to at least reduce an effect of the failure of the component and is based on the cause of the failure of the component. The method can further comprise, after the action is performed, recovering, by the system, the backed up data to the computing device.

An example non-transitory computer-readable medium can comprise instructions that, in response to execution, cause a system comprising a processor to perform operations. These operations can comprise structuring and analyzing system logs of a device. These operations can further comprise, based on the analyzing, determining a probability of a failure of a part of the device. These operations can further comprise, based on determining that a value of the probability falls within a first range of probability values, wherein possible probability values are divided into ranges that correspond to specified actions, and wherein the ranges comprise the first range, initiating a data backup of the device to produce backed up data, determining a cause of the failure of the part, and triggering an action of the device that mitigates against the failure of the part and is based on the cause of the failure of the part. These operations can further comprise, after the action is performed, recovering the backed up data to the device.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 5 illustrates an example system log that can facilitate proactive auto-correction to reduce dispatches at customer environment, in accordance with an embodiment of this disclosure;

DETAILED DESCRIPTION

Overview

Figure 1:
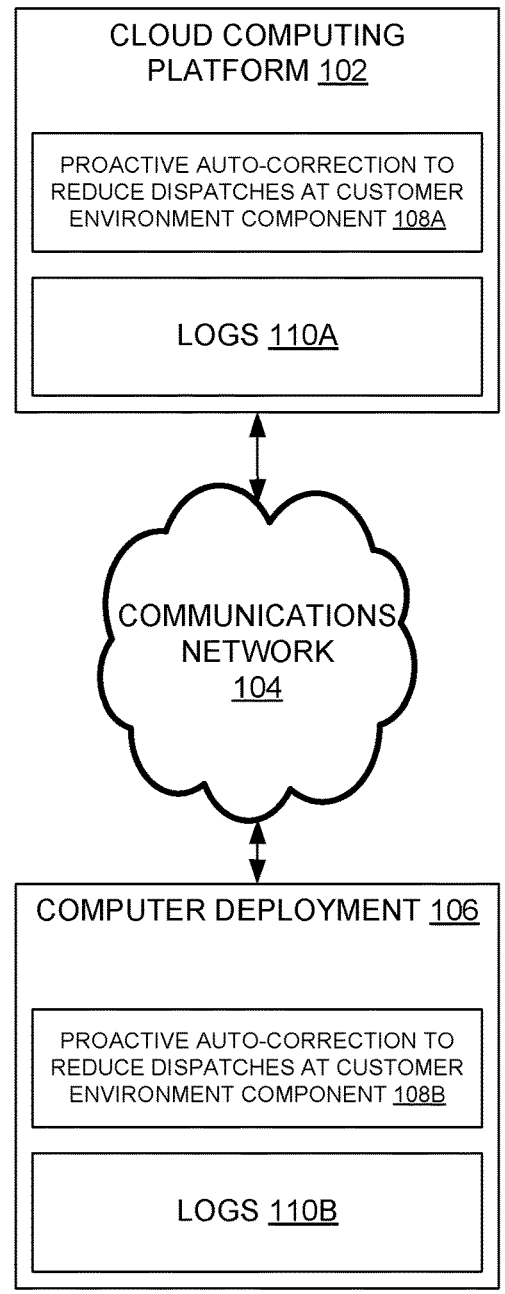
FIG. 1 illustrates an example system architecture that can facilitate proactive auto-correction to reduce dispatches at customer environment, in accordance with an embodiment of this disclosure.

The present techniques can be implemented to provide a framework for proactive auto-correction to reduce dispatches at a user environment. That is, according to the present techniques, preliminary technical analysis of issues up front can be performed to reduce the dispatches and understand a heartbeat of the underlying components/commodities of the server in enterprise/client infrastructure solutions. Understanding common operating types (sometimes referred to as a "heartbeat") of systems in functioning can be utilized to predict failures of those in the preliminary stages, and plan for self-healing and recovery.

The present techniques can be implemented to facilitate a software-defined logical layer grouping of system commodities, which can facilitate improved data integrity, load balancing, performance, and other capabilities, by providing for efficient management and utilization of software-defined resources across different operating system (OS) instances for different systems.

A training dataset can be utilized to develop a methodology that facilitates a tool in comprehending event logs, heartbeats, and periodic statistics data of a system's components, which can aid in preventing setbacks or critical events. This methodology can include a set of technical and business actions that can be taken to address issues.

Providing highly available and reliable services in a cloud computing platform can facilitate maintaining user confidence and satisfaction, and reducing dispatches.

A quality process can ensure that a software product meets requirements by testing, and by reviewing its functional and non-functional requirements. Greater levels of user satisfaction can be a focus area to develop a more effective and efficient success program. A computer can have multiple dispatches within a given amount of time due to various reasons, which can result in a poor user experience. It can be that dispatches are not able to reduce to perfection, and the reason for the dispatches will get affected by technical issues sooner or later. It can be that there is no clear and smart mechanism to predict a dispatch occurrence ahead of time for a failure of existing components in a system.

In monitoring the health of the server, and its components, including hard drives, central processing units (CPUs), memory, etc., it can be a goal to ensure uninterrupted operation and a seamless user experience. A hard drive malfunctioning or crashing, high memory consumption with semaphore leakage, CPU usage for various server performance attributes, etc., can occur, and it can be that there is no scope for user early detection and prevention to save the computer's data (such as by performing a backup). It can be that prior approaches lack a proactive mechanism to detect and alert a user of any predictive failures, and prevent unplanned downtime/recovery. The present techniques can be implemented to identify, analyze, and learn patterns by providing predictive analysis, and subsequently aid in reducing a frequency dispatches.

In some examples, a cause of failure for a hard drive can be inappropriate drivers, thrashing, a corrupt registry, a virus, slow system performance, a compatibility error, a read/write error, a corrupt hard drive, a media error, a surprise or accidental removal of the hard drive, etc.

In some examples, a cause of failure for memory can be an outdated basic input output system (BIOS) version, a BIOS flash crash, a correctable memory error, a multibit memory error, a single bit error correction code (ECC) error, a memory error without any code, a dual in-line memory module (DIMM) degradation error, a power problem overheating, etc.

During a system's the real-time utilization phase, user satisfaction with the existing infrastructure, the operating systems that are used to perform various tasks and operations can depend on the applications and services running on the system. These tasks can include handling input/output operations, managing memory and processing resources, providing a user interface, executing application code, managing network connectivity, and performing system maintenance and security functions.

Over a period, if too many applications are running, if there are corrupted files being executed, if there are any malware attacks, or if there are hardware restrictions, there can be bottleneck conditions and there can be several reasons for breakage.

These failures in a test environment, and earlier failures reported by users in a real-time environment, can be captured in training dataset logs. However, it can be that users and/or a support team might not understand how to debug these set of logs to take necessary corrective actions, and it can be that there is not a predictive model that can alert the user to take necessary actions before the system components/commodities end up in a failed state.

The following example messages comprise a few of the symptoms that a controller can log before it ends in a failed state: unrecoverable read error, critical system error detected, insufficient memory available, disk read/write failure, application or process crash, network connectivity loss, security breach detected, driver failure or compatibility issue, hardware failure detected, power loss or system shutdown unexpected, etc.

Likewise, there can be log entries that an OS reports, which can be expected log entries. These log entries can include: "kernel panic: unable to mount root filesystem," "fatal system error: blue screen of death," "out of memory: kill process," "input/output (I/O) error: disk read/write failure," "critical process died unexpectedly," "error accessing registry key," "application crash: segmentation fault," "network connection lost: Domain Name System (DNS) resolution failure," "authentication failure: login attempt rejected," "power loss detected: unexpected shutdown," etc.

To summarize the above, during an issue triage and system monitoring process, an initial step can be to check for log instances (errors, exceptions, critical log entry, etc.), particularly if there is a cluster of such events across multiple logs, which can be vast, noisy, and mostly unstructured.

Prior approaches for reducing dispatches for system commodities and data recovery can face the following challenges:

It can be that there is no proactive mechanism to predict an issue at an early stage, and provide a remediation plan to the user whereby dispatches can be reduced significantly and provide positive impact (e.g., planned maintenance, avoid user interruption, prevent data unavailability/loss) with high-confidence success metrics, and business efficiency can be reduced to meet customer satisfaction.

It can be that there is a lack of real-time awareness of a potential failure providing insight at an early stage. Even with an early warning, it can be that a user does not have time to prevent an impact on the critical data to protect data, or backing up on cloud/remote storage can be infeasible.

It can be that tech support identifying a solution by troubleshooting can require server downtime, which can be impactful on a user's operation and maintenance window. This can cause interruption for users to diagnose and rectify problems, causing delayed recovery, server downtime, data loss, frustration, and negative user experience.

The present techniques can be implemented to facilitate predictive analysis from an entity/system, which can lead to a positive outcome for an entire install base of similar user environments/platforms/commodities. This approach can benefit users to make a right decision on a day-day basis, providing high quality user experience.

An unpredictability of critical events/setbacks impacts on user time and resources can result in a negative user experience. It can be that there is no prediction methodology/model that provides an early warning to a user to take necessary remediation plan with a list of corrective actions and propose if there is a scope of enhancing user operations, and thereby reducing dispatches.

The present techniques can be implemented to facilitate a proactive approach and automatic smart mechanism for alerting users with a remediation/recommendation plan, and predicting possible upcoming component failures by validation and verification of a current state and co-relating with the unstructured parsed telemetry (trained dataset).

The present techniques can be implemented to facilitate techniques for analyzing and prioritizing unstructured logs from various system components at a user environment, such as symptom contact text, existing BIOS/firmware (FW) version on the system, security logs, application logs, etc., that proposes a checklist identifier to identify a critical status of the system.

This can facilitate the following example options for proactive solutions to user decisions:

The user accepts applying this remediation plan. By analyzing system performance and the current BIOS/FW version of the user environment, an autocorrection implementation can be put in place to track disk and memory errors. This can allow for prediction of an upcoming state of errors, ultimately reducing a need for dispatch.

A user requires further troubleshooting to confirm the provided remediation plan. This approach can be beneficial if the user is satisfied with an existing remediation plan from the above option, and desires additional help and confirmation from tech support to validate the solution.

The user chooses not to apply remediation due to internal policies. Where a user has a restriction in its environment and has internal policies that mandate a delayed adoption of the remediation plan (e.g., one of the above options), the user can choose to stay with existing BIOS and FW versions. The user can be provided with a notification and remedial plan for which to apply when it is ready.

Prior approaches have drawbacks. There are recovery techniques for recovering data for disk and memory, but they lack prediction techniques. Additionally, there are no auto-correction techniques for a scenario with an existing user environment. For instance, it can be that third-party applications restrict malicious applications or file downloads can cause disk crash and memory to not function.

The present techniques can be implemented to check third-party applications and versions of them that are running, and update those applications without user intervention.

The present techniques can be implemented to prevent data losses that can occur from a sudden system crash. If a user is notified in advance of a system state, a data backup can be easier and simpler. Predictions from a service that implements the present techniques can help in completing a task without delay from unplanned issues (e.g., data loss).

The present techniques can be implemented to reduce dispatches of a technician to a user site, and can generate predictive data-driven insights and expert analysis to drive decisions and actions to deliver exceptional user experiences and improve business efficiency.

The present techniques can be implemented to provide a portfolio of high-confidence success metrics that can consistently guide efforts towards making a positive impact on users that are rooted in data, innovation, and user-centricity.

The present techniques can be implemented to extend user infrastructure in market where system component failures can be detected and predicted with recovery options.

The present techniques can differ from prior approaches. There can be approaches that comprise a powerful log management and analysis platform, but that are not designed to handle corrective action for any issues identified, and work on self-healing process. Such implementations can also be expensive for large-scale deployments, and in contrast the present techniques can utilize centralized computing intelligence, which can keep a cost constant irrespective of scale used.

There can be approaches that are capable of pushing events, and managing them in a centralized manner. But unlike the present techniques, they can lack intelligence to structure the data, classify the data, and analyze the data for identifying potential failures or errors, and triggering a self-healing action for correcting/preventing that failure or error.

There can be approaches that classify and monitor logs. In contrast, the present techniques can be capable of understanding the problem, and can be tuned to predict the corresponding self-healing action through which troubleshooting or corrective action can be performed.

That is, in contrast to approaches that can use ML tools for logs collection and analytics, the present techniques can be unique in that they can be capable of predicting a root cause of a problem, as identified through AI techniques, and they can initiate corrective or self-healing action for the identified problem.

In some examples, air-gapped users (those whose computers are not connected to a public communications network and so cannot access cloud resources) can be supported by the present techniques. Related infra can be configured intra network, such as to pool logs of different devices to a server that can run an AI/ML analytics engine.

The present techniques can be implemented as more than a data analytics platform. Rather, the present techniques can incorporate AI techniques that can predict failures and errors that hinder system health and performance in advance. The present techniques can also be implemented to determine a root cause of such anomalies, and can determine corresponding self-healing and/or troubleshooting activities for corrective healing of systems without human intervention.

Example Architectures, Graphs, Etc.

FIG. 1 illustrates an example system architecture 100 that can facilitate proactive auto-correction to reduce dispatches at customer environment, in accordance with an embodiment of this disclosure.

System architecture 100 comprises cloud computing platform 102, communications network 104, and computer deployment 106. In turn, cloud computing platform 102 comprises proactive auto-correction to reduce dispatches at customer environment component 108A, and logs 110A; and deployment comprises proactive auto-correction to reduce dispatches at customer environment component 108B and logs 110B.

System architecture 100 presents one logical example of implementing the present techniques, and it can be appreciated that there can be other examples, such as one where the operations of cloud computing platform 102 are performed within computer deployment 106.

Figure 13:
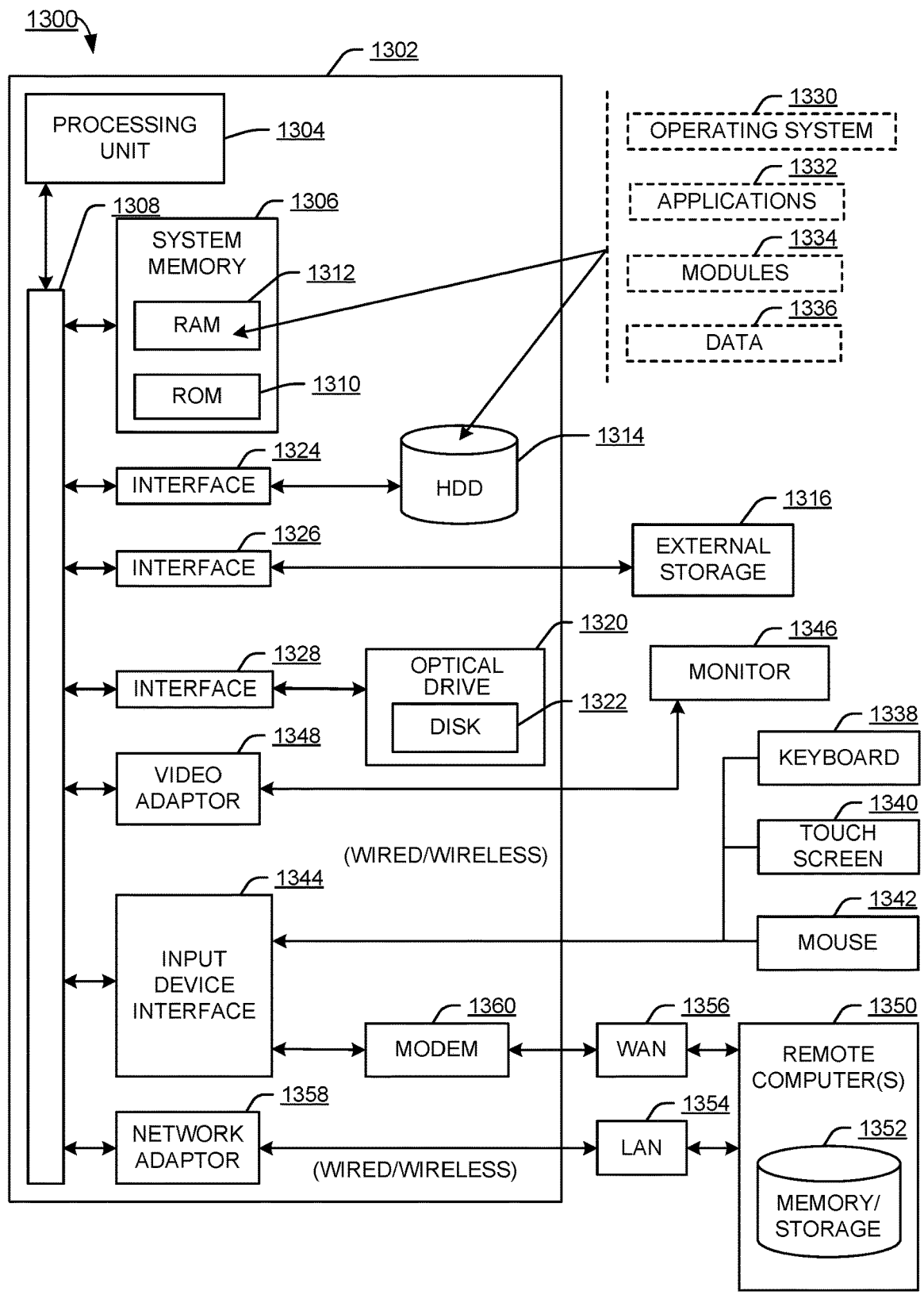
FIG. 13 illustrates an example block diagram of a computer operable to execute an embodiment of this disclosure.

Each of cloud computing platform 102 and/or computer deployment 106 can be implemented with part(s) of computing environment 1300 of FIG. 13. Communications network 104 can comprise a computer communications network, such as the Internet, or an intranet.

Cloud computing platform 102 can generally comprise a computer system that provides on-demand computing resources to multiple entities via communications network 104. Computer deployment 106 can generally comprise one or more computing devices installed at a physical location that are under the control of one entity.

In some examples, proactive auto-correction to reduce dispatches at customer environment component 108B can access logs 110B on computer deployment 106, and upload them to cloud computing platform 102, where they are stored as logs 110A. Proactive auto-correction to reduce dispatches at customer environment component 108A on cloud computing platform 102 can process logs 110B to predict a future failure of a component of computer deployment 106 (e.g., failure of a storage drive, or memory), where the prediction can include a likelihood that the failure will occur at various points in time.

The prediction can comprise multiple respective predictions for multiple respective hardware components of computer deployment 106. Where the prediction indicates that a corrective action should be taken (e.g., backing up data from a storage drive for which a failure prediction has been made), then proactive auto-correction to reduce dispatches at customer environment component 108A can send an indication of the prediction and/or the corrective action to proactive auto-correction to reduce dispatches at customer environment component 108B, where proactive auto-correction to reduce dispatches at customer environment component 108B can implement the corrective action on computer deployment 106.

Figure 10:
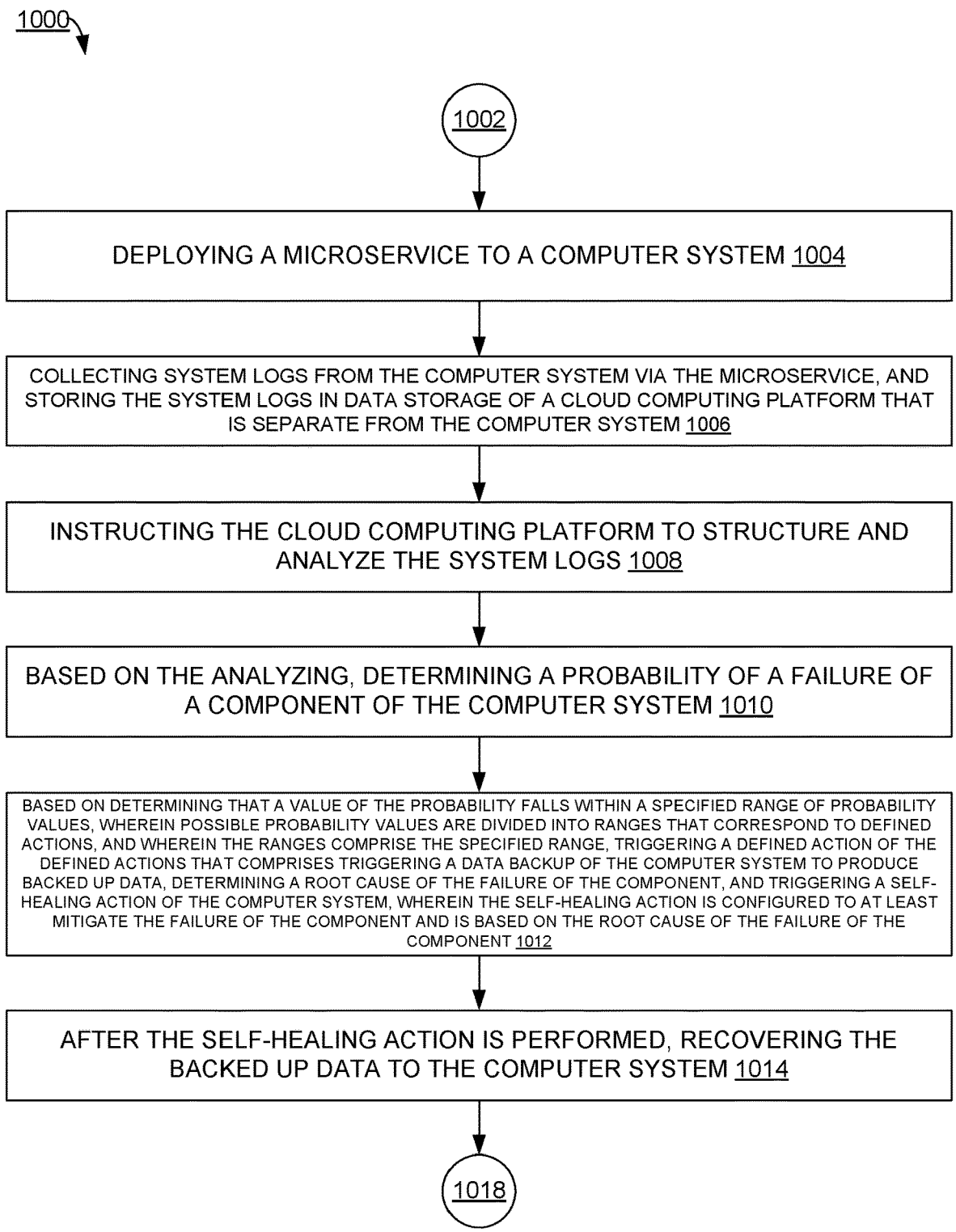
FIG. 10 illustrates an example process flow that can facilitate proactive auto-correction to reduce dispatches at customer environment, in accordance with an embodiment of this disclosure.
Figure 11:
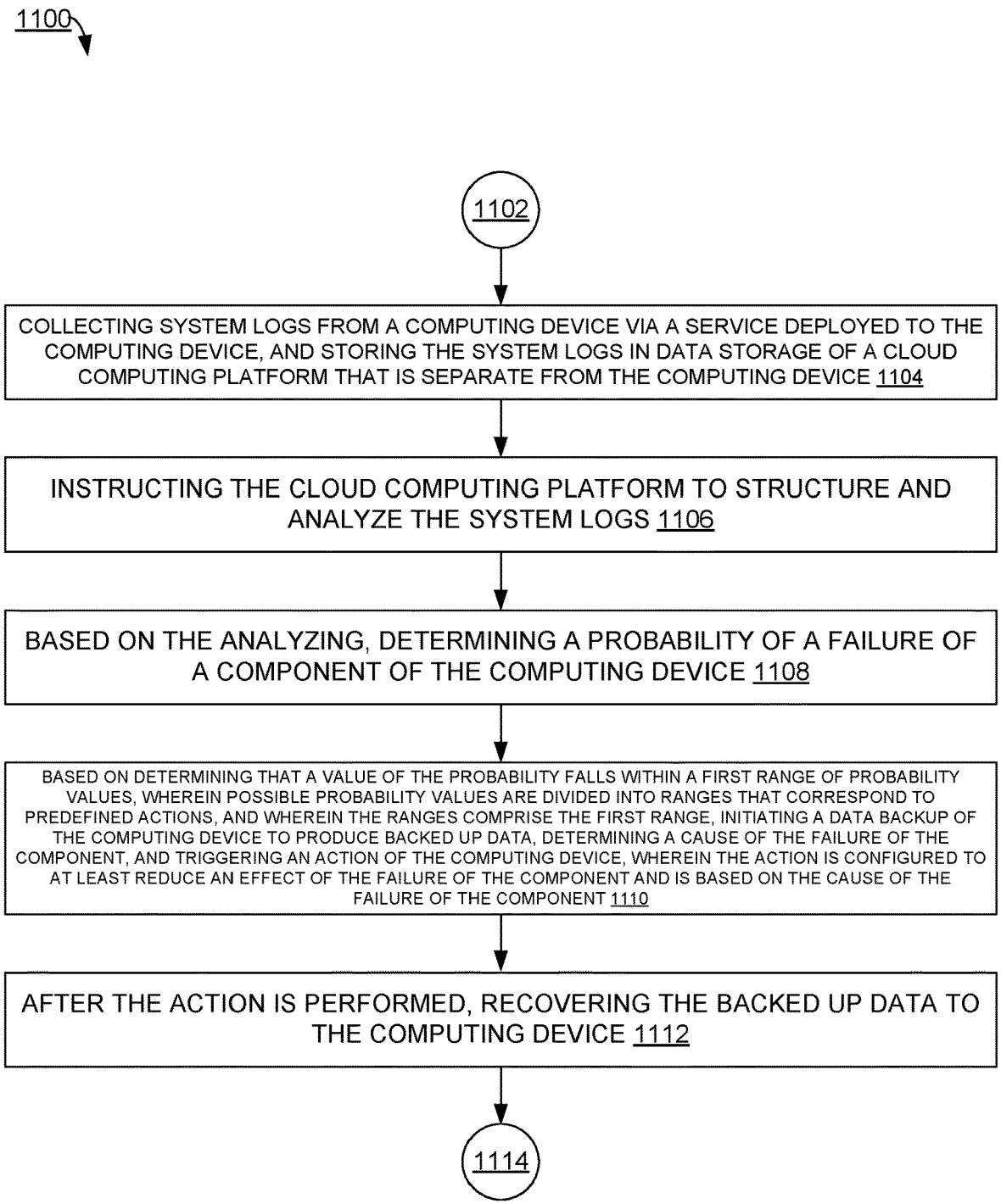
FIG. 11 illustrates another example process flow that can facilitate proactive auto-correction to reduce dispatches at customer environment, in accordance with an embodiment of this disclosure.
Figure 12:
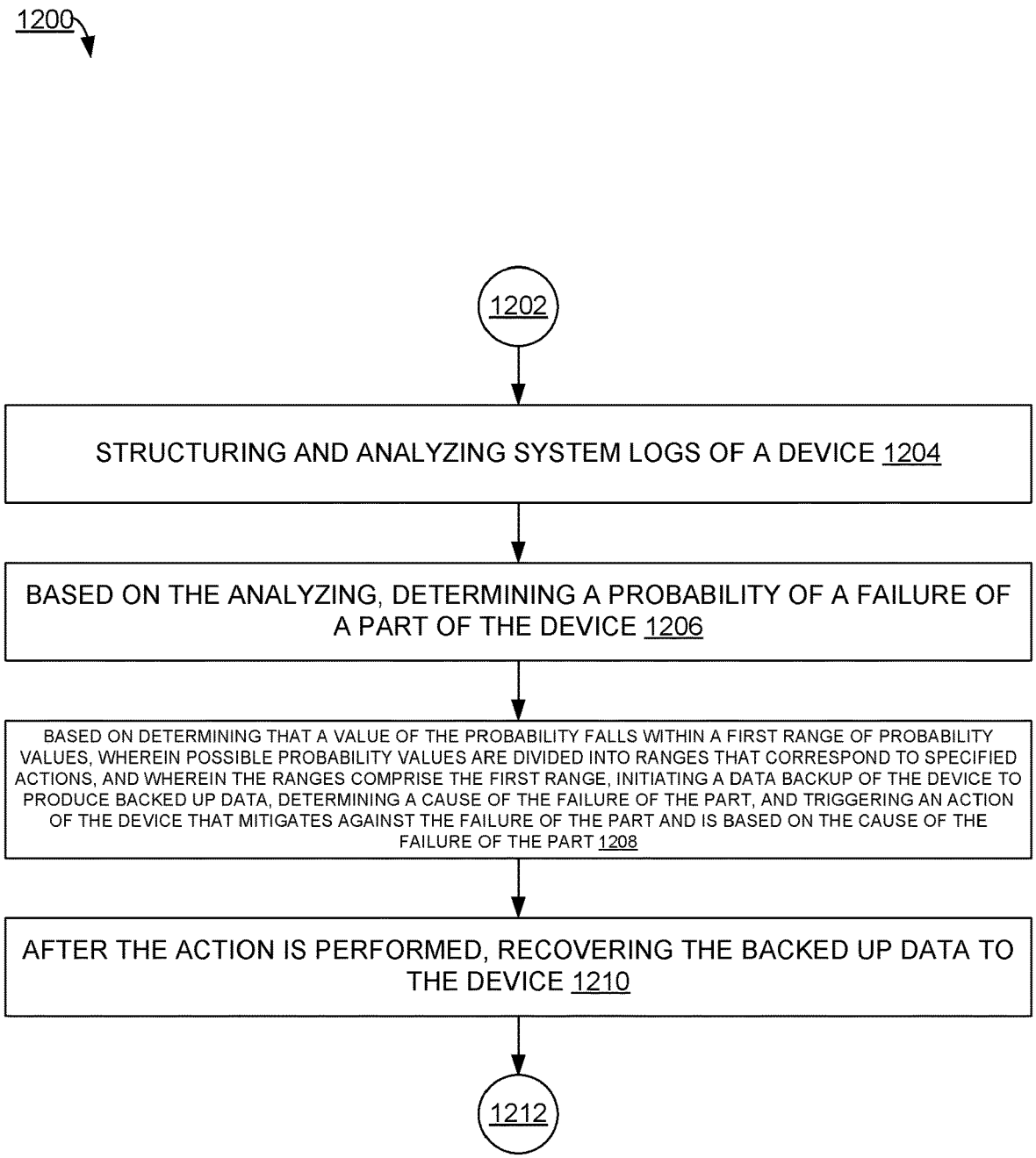
FIG. 12 illustrates another example process flow that can facilitate proactive auto-correction to reduce dispatches at customer environment, in accordance with an embodiment of this disclosure.

In some examples, proactive auto-correction to reduce dispatches at customer environment component 108A and/or proactive auto-correction to reduce dispatches at customer environment component 108B can implement part(s) of the process flows of FIGS. 10-12 to implement proactive auto-correction to reduce dispatches at customer environment.

It can be appreciated that system architecture 100 is one example system architecture for proactive auto-correction to reduce dispatches at customer environment, and that there can be other system architectures that facilitate proactive auto-correction to reduce dispatches at customer environment.

Figure 2:
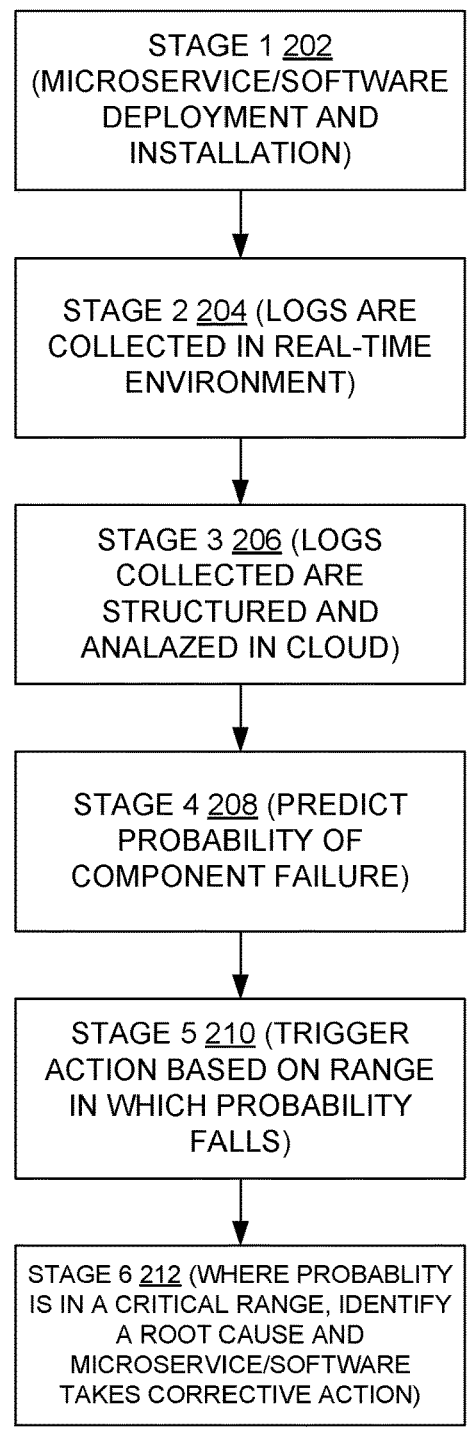
FIG. 2 illustrates another example system architecture that can facilitate proactive auto-correction to reduce dispatches at customer environment, in accordance with an embodiment of this disclosure.

FIG. 2 illustrates another example system architecture 200 that can facilitate proactive auto-correction to reduce dispatches at customer environment, in accordance with an embodiment of this disclosure. In some examples, part(s) of system architecture 200 can be implemented by part(s) of system architecture 100 of FIG. 1 to facilitate proactive auto-correction to reduce dispatches at customer environment.

System architecture 200 comprises stage 1 202, stage 2 204, stage 3 206, stage 4 208, stage 5 210, and stage 6 212.

In some examples, the present techniques can be implemented with six stages. It can be appreciated that the following is an example, and there can be other ways of implementing the present techniques.

In stage 1 202, a microservice/software is built based on an artificial intelligence/machine learning (AI/ML) model, where the model can initially be trained using a pattern of logs with a real-time environment for a failure as detected by a system. The microservice/system can be published independently, or published with an operating system update where the user can install the update on their system.

Software can be installed with necessary permissions/rights from the user (e.g., an end-user licensing agreement (EULA) consent), the microservice/software can be activated, and it can establish connection with the operating system.

The microservice/software can be built in such a way as to be lightweight, by using cloud computing resources that can reduce a load on a local system, and impact overall performance. A distributed computing architecture can be implemented, which can facilitate an analytics engine being distributed across multiple devices or servers. In some examples, this can improve scalability and reduce a load on individual devices. Additionally, the analytics engine can be optimized for performance and/or efficiency.

In stage 2 204, the microservice/software can comprise a module where user logs are collected. These logs can include application logs, security logs, setup logs, system logs, forwarded event logs, etc. This data can be collected and stored in a cloud resource so that the microservice/software is lightweight, to avoid a load/stress that can occur on a system from running the microservice/software.

In some examples, logs collected in a real-time environment (e.g., computer deployment 106 of FIG. 1) can be stored in the cloud (e.g., cloud computing platform 102 of FIG. 1) to conserve storage space at the real-time environment.

In stage 3 206, the data collected in stage 2 204 can be fed to an analytics engine that can run on a cloud resource (so as to enhance performance and speed of the microservice/software).

Real time data can be collected using an AI/ML model so that the present techniques can be implemented in a real-time manner. The data can be collected and analyzed periodically for predicting a state of system components and maintaining a critical/vulnerable information about components in one centralized location (e.g., on a cloud resource) for decision-making, problem-solving, and triage.

The data can be fed to an analytics engine where the logs can be structured and categorized, which can aid in pattern generation. Once a pattern is generated, the logs can be analyzed/compared/validated with an initial trained dataset for possible matches and patterns. Based on a percentage of match/occurrence/frequency, a kind of pattern can be identified.

For example, multiple linear regression model can be used for regular data modeling, and a time series technique can be used for future prediction.

This can be expressed using the following example pseudo code:
Data loading ###
Loading data collected from multiple hard drives over time;
the data structure can take the form:
time_stampe |Feature 1| . . . |Feature n|has failed
The features can be hard drive related data, such as:
1) type, model, drive size, vendor etc.
2) Hard drive signals: temperature, load, voltage, Read/writes etc.
Data preprocessing ###
1) Addressing missing values-(filling with value (if NAN—can add mean value) or removing-depending on an importance and missing data percentage)
2) Feature engineering-adding features per domain knowledge experts
3) Removing redundant data
4) Normalizing the data using min/max
Data preprocessing for regression model ###
Splitting the data into train x-y with 70% training, 20% testing, and 10% validation
Data can be shuffled before splitting
Data preprocessing for the Time series model ###
1) Deciding on a lookout window and granulation level
2) Creating features: features to address the granularity level (date, hrs, min, see, etc.), features with lagging to support time series
2) It can be that splitting the data into train x-y with 70% training, 20% testing, and 10% validation will not be shuffled before splitting
Modeling ###
Creating a Regression model for percent fail prediction ###
Examining different models: random forest, gradient boosting, spars multivariant linear regression (MLR), etc.
1) Hyperparameter tuning for non-linear models using a grid search
2) Setting and accuracy measurement: root mean square error (RMSE), mean absolute error (MAE), mean absolute percentage error (MAPE)
3) Training and testing the data with cross-validation
4) Choosing the model with sufficient performance
Creating a Time series model for percent fail prediction ###
Examining different models: gradient boosting, prophet, deep learning approaches (e.g., neural prophet), etc.
1) Hyperparameter tuning for non-linear models using a grid search
2) Setting and accuracy measurement: MAPE
3) Training and testing the data with cross-validation
4) Choosing the model with the best performance

Stage 4 208, stage 5 210, and stage 6 212 are described with respect to the following figures.

Figure 3:
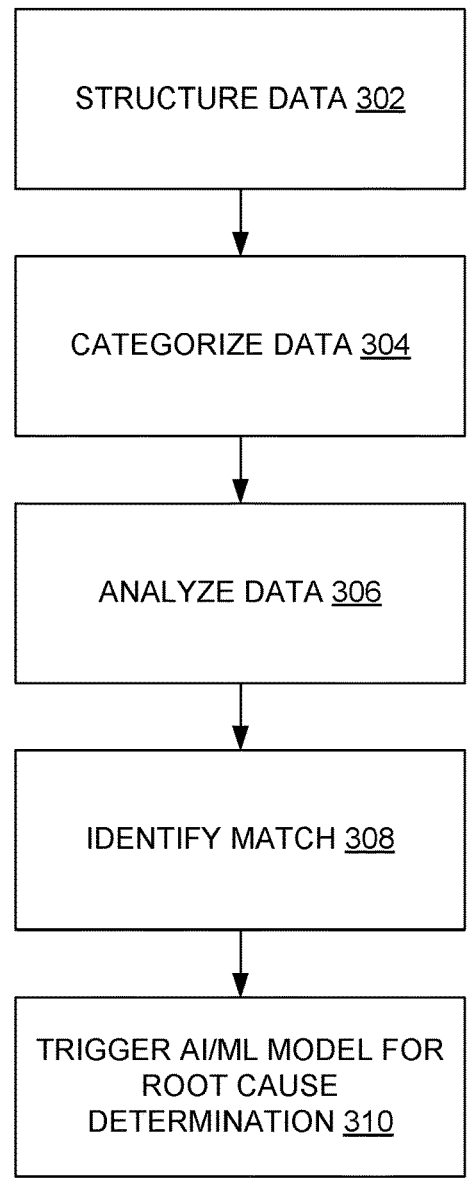
FIG. 3 illustrates an example system architecture for a data analytics engine that can facilitate proactive auto-correction to reduce dispatches at customer environment, in accordance with an embodiment of this disclosure.

FIG. 3 illustrates an example system architecture 300 for a data analytics engine that can facilitate proactive auto-correction to reduce dispatches at customer environment, in accordance with an embodiment of this disclosure. In some examples, part(s) of system architecture 300 can be implemented by part(s) of system architecture 100 of FIG. 1 to facilitate proactive auto-correction to reduce dispatches at customer environment.

In some examples, system architecture 300 can be used to implement stage 4 208 of FIG. 2. System architecture 300 comprises structure data 302, categorize data 304, analyze data 306, identify match 308, and trigger AI/ML model for root cause determination 310.

Structure data 304 can comprise structuring data from a format of logs (e.g., logs 110A of FIG. 1) into another format. Categorize data 304 can comprise categorizing the data that is structured in structure data 302, such as by, for example, a type of log that the data is from. Analyze data 306 can comprise performing analysis on the structured data of structure data 304 with a trained dataset, where the trained dataset is captured during component failures (of computer deployment 106 of FIG. 1, or another computer deployment).

Identify match 308 can comprise identifying match(es) between the current logs being analyzed and a trained dataset pattern. Trigger AI/ML model for root cause determination 310 can comprise triggering the execution of a trained AI/ML model to perform root cause determination on a predicted failure, where the triggering occurs based on finding a sufficient pattern match in identify match 308.

In stage 4 208, a probability system component/subcomponent failure can be predicted based on a match percentage, and a kind of logs present in the matching criteria. The following is an example for determining a probability of a crash.

In one scenario, there can be a higher match criterion relative to other scenarios (e.g., 80%), but the logs associated with the pattern are warning/information logs, then it can be determined that a severity/criticality of component failure is low.

In another scenario, there can be a lower match criterion (e.g., 50%), but the logs associated with the pattern are critical logs.

The present techniques can be implemented such that an AI/ML model analyzes and determines a probability of component failure based on multiple scenarios.

Figure 4:
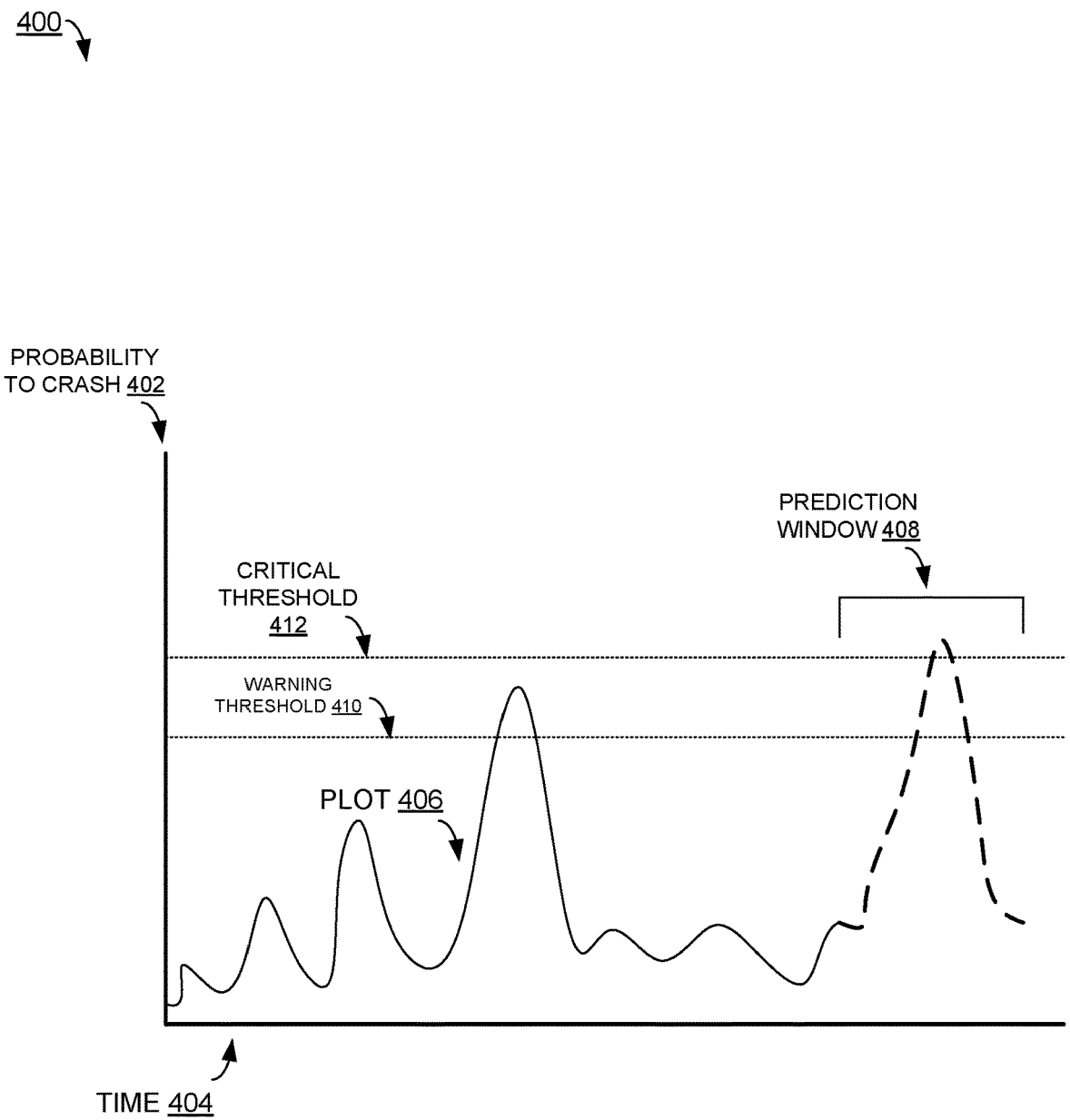
FIG. 4 illustrates an example prediction graph that can facilitate proactive auto-correction to reduce dispatches at customer environment, in accordance with an embodiment of this disclosure.

FIG. 4 illustrates an example prediction graph 400 that can facilitate proactive auto-correction to reduce dispatches at customer environment, in accordance with an embodiment of this disclosure. In some examples, part(s) of prediction graph 400 can be implemented by part(s) of system architecture 100 of FIG. 1 to facilitate proactive auto-correction to reduce dispatches at customer environment.

In some examples, prediction graph 400 can be used to implement stage 5 210 of FIG. 2. Prediction graph 400 comprises probability to crash 402 (y-axis), time 404 (x-axis), plot 406, prediction window 408, warning threshold 410, and critical threshold 412.

Plot 406 can comprise a plot of a probability of a specific component crashing over time. Plot 406 can cover a past period of time that has already occurred, as well as a prediction for the future, indicated by prediction window 408. Where plot 406 has a prediction for the future that rises to the level of warning threshold 410 or critical threshold 412, a corrective action can be taken.

In prediction graph 400, a regression model for a particular component (e.g., a storage drive) can determine that a prediction for failure is above a warning threshold. At another time, a time-series model can be used to generate predictions into the future, and based on these predictions, a regression model can determine that a probability of failure will cross a warning threshold. Where a probability is above a threshold, both the drive for which the prediction is made and a backup drive can start recording simultaneously, and the drive for which the prediction is made can have its historical data backed up (e.g., to the backup drive, or to a cloud platform).

In stage 5 210, once a probability is determined for real-time systems in stage 4 208, the model can determine whether a predicted probability falls under a warning threshold or a critical threshold limit.

A value for warning threshold 410 and a value for critical threshold 412 can be pre-determined based on analyzing past data in a test and/or real-time environment.

Warning threshold 410 can be implemented to notify a user about a critical time approaching, and to take appropriate actions. Where a system component failure prediction is approaching, warning threshold 410 (which can be a pre-stage to a critical failure) can be triggered to notify a user and, e.g., perform automatic data backup in local storage to migrate the local data on a cloud resource.

Where a predicted value falls in a range beyond critical threshold 412, a data backup can be triggered if not performed earlier, and the root cause can be predicted for criticality of a system.

In such an example, a user can be informed of a start of a self-healing action where complete control can be taken by the microservice/software, and a corresponding self-healing action can be performed by the model without user intervention.

In some examples, in stage 5 210, a data backup can be triggered, such as when the prediction is in a critical range and before a self-healing action is triggered.

In stage 6 212, where the probability is in a critical range, a root cause for the situation can be identified, and a corrective action can be taken. In some examples where data has been backed up as part of stage 5 210, once the self-healing action is completed, the data can be recovered from the backup location to the storage drive that it was backed up from.

FIG. 5 illustrates an example system log 500 that can facilitate proactive auto-correction to reduce dispatches at customer environment, in accordance with an embodiment of this disclosure. In some examples, part(s) of system log 500 can be implemented by part(s) of system architecture 100 of FIG. 1 to facilitate proactive auto-correction to reduce dispatches at customer environment.

System log 500 can be similar to a log of logs 110A and/or logs 110B of FIG. 1. System log 500 comprises time 502, message 504, server model/drive model 506, severity 508, category 510, message ID 512, current BIOS/FW version 514, and recommended BIOS/FW version 516. Also depicted is proactive auto-correction to reduce dispatches at customer environment component 518, which can be similar to proactive auto-correction to reduce dispatches at customer environment component 108A and/or proactive auto-correction to reduce dispatches at customer environment component 108B of FIG. 1, and which can use information in system log 500.

In addition to the example of system log 500, the following are also example log formats that can be used in conjunction with the present techniques.

1. Memory Component is Triggering at the User Environment for a Particular Server Model
   Existing BIOS value: 2.4.5
   Recommended BIOS value: 2.13.3 (Latest version 2.17.1)
   Error: Correctable Memory Error (MEM8000)
   Remediation/Recommendation Plan:
      Updating BIOS value to recommended version can address various critical memory errors as a correctable memory error, dual in-line memory module (DIMM) degradation error, single bit error correction code (ECC) error, a critical diagnostic memory event detected.

2. Hard Drive Component is Triggering at the User Environment for a Particular Server Model
   Firmware of the hard drive model (4 TB) at the user environment: CSJ7
   Recommended Firmware: CSJA
   Error: predictive drive failure with sense key error
   Remediation/Recommendation Plan:
      Updating drive firmware to the recommended version, which can address the fix for the issues related to unrecoverable read error, bad block media error, end-to-end error/input-output error detection (IOEDC) error, command timeout error, and drive hang condition.

In a sixth stage, a self-healing task can be performed, and as part of an initial self-healing activity, a root cause of this critical behavior can be predicted at an early stage.

Based on historical trained data and test environment data, a corresponding work around can be identified that can overcome this criticality and heal the server components, which can reduce dispatches to repair the server.

Where multiple solutions for a same root cause are available, based on a success rate in the past for recovering the server component, a solution can be selected from the model, and a corresponding action can be triggered.

Figure 6:
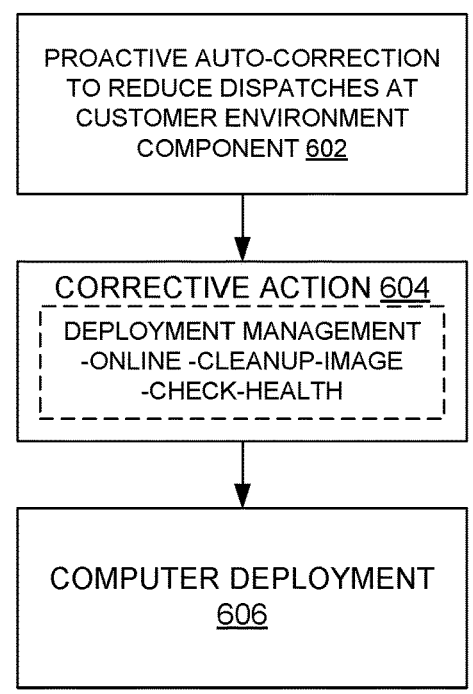
FIG. 6 illustrates an example of taking a remediating action can facilitate proactive auto-correction to reduce dispatches at customer environment, in accordance with an embodiment of this disclosure.

FIG. 6 illustrates an example 600 of taking a remediating action can facilitate proactive auto-correction to reduce dispatches at customer environment, in accordance with an embodiment of this disclosure. In some examples, part(s) of example 600 can be implemented by part(s) of system architecture 100 of FIG. 1 to facilitate proactive auto-correction to reduce dispatches at customer environment.

Example action items to take in corrective action to a predicted failure can be as follows, as described with respect to FIGS. 6-9.

Example 600 comprises proactive auto-correction to reduce dispatches at customer environment component 602 (which can be similar to proactive auto-correction to reduce dispatches at customer environment component 108A and/or proactive auto-correction to reduce dispatches at customer environment component 108B of FIG. 1); corrective action 604; and computer deployment 606 (which can be similar to computer deployment 106 of FIG. 1).

In some examples, proactive auto-correction to reduce dispatches at customer environment component 602 can implement corrective action 604 on computer deployment 606.

Where corrupt files that are causing problem for OS performance are present, corrective action 604 can be taken as part of a self-healing activity.

If there are any files detected, they can be cleared/deleted, and OS space can be cleaned up from this threat.

Figure 7:
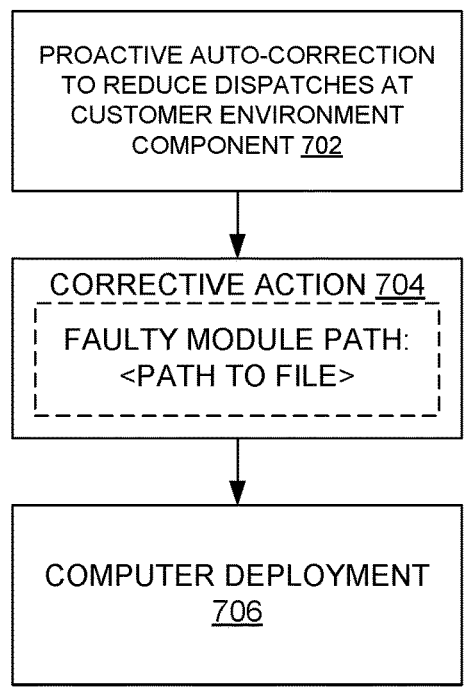
FIG. 7 illustrates another example of taking a remediating action can facilitate proactive auto-correction to reduce dispatches at customer environment, in accordance with an embodiment of this disclosure.

FIG. 7 illustrates another example 700 of taking a remediating action can facilitate proactive auto-correction to reduce dispatches at customer environment, in accordance with an embodiment of this disclosure. In some examples, part(s) of log 700 can be implemented by part(s) of system architecture 100 of FIG. 1 to facilitate proactive auto-correction to reduce dispatches at customer environment.

Example 700 comprises proactive auto-correction to reduce dispatches at customer environment component 702 (which can be similar to proactive auto-correction to reduce dispatches at customer environment component 108A and/or proactive auto-correction to reduce dispatches at customer environment component 108B of FIG. 1); corrective action 704; and computer deployment 706 (which can be similar to computer deployment 106 of FIG. 1).

In some examples, proactive auto-correction to reduce dispatches at customer environment component 702 can implement corrective action 704 on computer deployment 706.

In corrective action 704, application causing error logs can be identified by analyzing OS logs and by identifying the particular application that causes the error. Based on the severity/criticality and its subsequent effect, a suggestion can be made to stop and/or uninstall the application.

Figure 8:
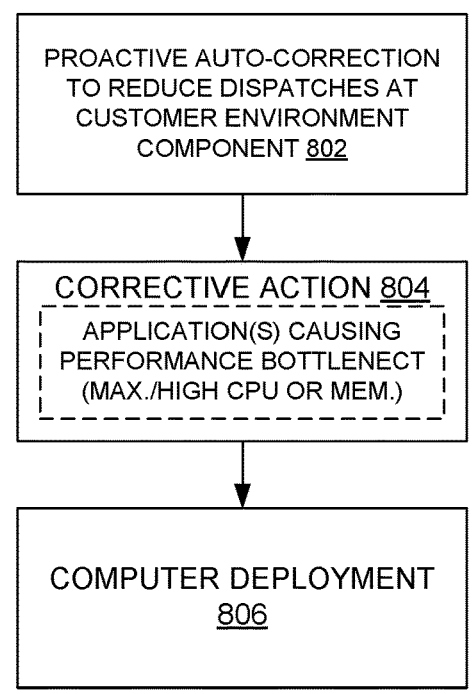
FIG. 8 illustrates another example of taking a remediating action can facilitate proactive auto-correction to reduce dispatches at customer environment, in accordance with an embodiment of this disclosure.

FIG. 8 illustrates another example 800 of taking a remediating action can facilitate proactive auto-correction to reduce dispatches at customer environment, in accordance with an embodiment of this disclosure. In some examples, part(s) of system architecture 200 can be implemented by part(s) of log 800 of FIG. 1 to facilitate proactive auto-correction to reduce dispatches at customer environment.

Example 800 comprises proactive auto-correction to reduce dispatches at customer environment component 802 (which can be similar to proactive auto-correction to reduce dispatches at customer environment component 108A and/or proactive auto-correction to reduce dispatches at customer environment component 108B of FIG. 1); corrective action 804; and computer deployment 806 (which can be similar to computer deployment 106 of FIG. 1).

In some examples, proactive auto-correction to reduce dispatches at customer environment component 802 can implement corrective action 804 on computer deployment 806.

In corrective action 804, applications causing a performance bottleneck with elevated central processing unit (CPU) and/or memory consumption that are responsible/leading to chances of OS crash can be identified.

Figure 9:
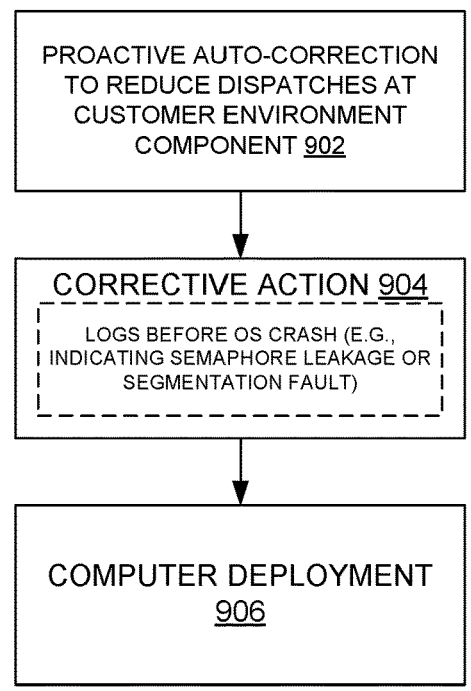
FIG. 9 illustrates another example of taking a remediating action can facilitate proactive auto-correction to reduce dispatches at customer environment, in accordance with an embodiment of this disclosure.

FIG. 9 illustrates another example 900 of taking a remediating action can facilitate proactive auto-correction to reduce dispatches at customer environment, in accordance with an embodiment of this disclosure. In some examples, part(s) of system architecture 200 can be implemented by part(s) of log 900 of FIG. 1 to facilitate proactive auto-correction to reduce dispatches at customer environment.

Example 900 comprises proactive auto-correction to reduce dispatches at customer environment component 902 (which can be similar to proactive auto-correction to reduce dispatches at customer environment component 108A and/or proactive auto-correction to reduce dispatches at customer environment component 108B of FIG. 1); corrective action 904; and computer deployment 906 (which can be similar to computer deployment 106 of FIG. 1).

In some examples, proactive auto-correction to reduce dispatches at customer environment component 902 can implement corrective action 904 on computer deployment 906.

In corrective action 904, a logs pattern before a crash occurs can be identified.

For example, there can be a semaphore leakage/crash, a segmentation fault, etc.

In corrective action 904, where a pattern is analyzed in real-time logs that are collected, past historical data can be analyzed, where in that data this scenario was handled and a work around was suggested and/or an action was performed as part of a self-healing activity.

Example Process Flows

FIG. 10 illustrates an example process flow 1000 that can facilitate proactive auto-correction to reduce dispatches at customer environment, in accordance with an embodiment of this disclosure. In some examples, one or more embodiments of process flow 1000 can be implemented by proactive auto-correction to reduce dispatches at customer environment component 108A and/or proactive auto-correction to reduce dispatches at customer environment component 108B of FIG. 1, or computing environment 1300 of FIG. 131.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 1100 of FIG. 11, and/or process flow 1200 of FIG. 12.

Process flow 1000 begins with 1002, and moves to operation 1004.

Operation 1004 depicts deploying a microservice to a computer system. In some examples, operation 1004 can be implemented in a similar manner as stage 1 202 of FIG. 2. Using the example of FIG. 1, the microservice can be at least part of proactive auto-correction to reduce dispatches at customer environment component 108B, and the computer system can be computer deployment 106.

In some examples, the microservice comprises an artificial intelligence or machine learning model that is trained on a pattern of logs within a real-time environment (which can be computer deployment 106 of FIG. 1 and/or similar computer deployment 106, and in some examples can be based on multiple of such deployments) to produce a trained artificial intelligence or machine learning model, wherein the pattern of logs identifies a failure of the real-time environment, and wherein the trained artificial intelligence or machine learning model is configured to predict the failure over a period of time. In some examples, a time-series approach can be implemented to effectuate this.

In some examples, the microservice is deployed to the computer system as part of deploying an operating system update to the computer system. In other examples, the microservice can be deployed in a standalone manner, where it is deployed separate from an operating system update.

After operation 1004, process flow 1000 moves to operation 1006.

Operation 1006 depicts collecting system logs from the computer system via the microservice, and storing the system logs in data storage of a cloud computing platform that is separate from the computer system. In some examples, operation 1006 can be implemented in a similar manner as stage 2 204 of FIG. 2. Using the example of FIG. 1, the system logs can be logs 110B, and the cloud computing platform can be cloud computing platform 102.

In some examples, the system logs comprise an application log, a security log, a setup log, or a forward event log.

In some examples, the structuring and the analyzing of the system logs is performed by an analytics engine of the cloud computing platform, and wherein the analytics engine is distributed across multiple devices of the cloud computing platform. That is, a distributed architecture can be used to implement a data analytics engine.

After operation 1006, process flow 1000 moves to operation 1008.

Operation 1008 depicts instructing the cloud computing platform to structure and analyze the system logs. In some examples, operation 1008 can be implemented in a similar manner as stage 3 206 of FIG. 2.

After operation 1008, process flow 1000 moves to operation 1010.

Operation 1010 depicts, based on the analyzing, determining a probability of a failure of a component of the computer system. In some examples, operation 1010 can be implemented in a similar manner as stage 4 208 of FIG. 2.

After operation 1010, process flow 1000 moves to operation 1012.

Operation 1012 depicts, based on determining that a value of the probability falls within a specified range of probability values, wherein possible probability values are divided into ranges that correspond to defined actions, and wherein the ranges comprise the specified range, triggering a defined action of the defined actions that comprises triggering a data backup of the computer system to produce backed up data, determining a root cause of the failure of the component, and triggering a self-healing action of the computer system, wherein the self-healing action is configured to at least mitigate the failure of the component and is based on the root cause of the failure of the component. In some examples, operation 1012 can be implemented in a similar manner as stage 5 210 and stage 6 212 of FIG. 2.

In some examples, the triggering the self-healing action of the computer system is performed independently of receiving user input data indicative of the triggering. That is, the self-healing action can be triggered automatically, rather than manually by a user.

After operation 1012, process flow 1000 moves to operation 1014.

Operation 1014 depicts, after the self-healing action is performed, recovering the backed up data to the computer system. In some examples, operation 1004 can be implemented in a similar manner as stage 6 212 of FIG. 2.

In some examples, the backed up data is recovered from the cloud computing platform and sent to the computer system. That is, after the self-healing action is taken, the backed up data can be restored to the storage drive from which it was backed up.

After operation 1014, process flow 1000 moves to 1016, where process flow 1000 ends.

FIG. 11 illustrates an example process flow 1100 that can facilitate proactive auto-correction to reduce dispatches at customer environment, in accordance with an embodiment of this disclosure. In some examples, one or more embodiments of process flow 1100 can be implemented by proactive auto-correction to reduce dispatches at customer environment component 108A and/or proactive auto-correction to reduce dispatches at customer environment component 108B of FIG. 1, or computing environment 1300 of FIG. 131.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1100 of FIG. 11, and/or process flow 1200 of FIG. 12.

Process flow 1100 begins with 1102, and moves to operation 1104.

Operation 1104 depicts collecting system logs from a computing device via a service deployed to the computing device, and storing the system logs in data storage of a cloud computing platform that is separate from the computing device. In some examples, operation 1104 can be implemented in a similar manner as operation 1006 of FIG. 10.

After operation 1104, process flow 1100 moves to operation 1106.

Operation 1106 depicts instructing the cloud computing platform to structure and analyze the system logs. In some examples, operation 1106 can be implemented in a similar manner as operation 1008 of FIG. 10.

In some examples, instructing the cloud computing platform to structure and analyze the system logs is iteratively and periodically performed. That is, data can be collected and analyzed periodically.

In some examples, structuring the system logs comprises categorizing respective types of respective system logs of the system logs.

In some examples, analyzing the system logs comprises identifying a pattern in the system logs, and wherein determining the probability of the failure of the component of the computing device is performed based on the identifying of the pattern. That is, identifying a pattern between analyzed system logs and system logs that identify a pattern and have been used for training can trigger performing root-cause identification.

In some examples, the pattern is based on a rate of matching criteria between the system logs and a trained dataset that identifies the pattern.

In some examples, analyzing the system logs is performed with a multiple linear regression model, and wherein determining the probability is performed with a time series technique. That is, a multiple linear regression model can be used for regular data modeling, while a time series technique can be used for future prediction.

After operation 1106, process flow 1100 moves to operation 1108.

Operation 1108 depicts, based on the analyzing, determining a probability of a failure of a component of the computing device. In some examples, operation 1108 can be implemented in a similar manner as operation 1010 of FIG. 10.

In some examples, the system logs are first system logs, analyzing the first system logs identifies respective types of the respective first system logs, and determining the probability is based on an amount of matching between the first system logs and second system logs that identify a component failure that corresponds to the failure of the component and on the respective types of the respective first system logs. That is, a probability of a component failure can be predicted based on a match percentage, and on a kind of logs present in matching criteria.

After operation 1108, process flow 1100 moves to operation 1110.

Operation 1110 depicts, based on determining that a value of the probability falls within a first range of probability values, wherein possible probability values are divided into ranges that correspond to predefined actions, and wherein the ranges comprise the first range, initiating a data backup of the computing device to produce backed up data, determining a cause of the failure of the component, and triggering an action of the computing device, wherein the action is configured to at least reduce an effect of the failure of the component and is based on the cause of the failure of the component. In some examples, operation 1110 can be implemented in a similar manner as operation 1012 of FIG. 10.

After operation 1110, process flow 1100 moves to operation 1112.

Operation 1112 depicts, after the action is performed, recovering the backed up data to the computing device. In some examples, operation 1112 can be implemented in a similar manner as operation 1014 of FIG. 10.

After operation 1112, process flow 1100 moves to 1114, where process flow 1100 ends.

FIG. 12 illustrates an example process flow 1200 that can facilitate proactive auto-correction to reduce dispatches at customer environment, in accordance with an embodiment of this disclosure. In some examples, one or more embodiments of process flow 1200 can be implemented by proactive auto-correction to reduce dispatches at customer environment component 108A and/or proactive auto-correction to reduce dispatches at customer environment component 108B of FIG. 1, or computing environment 1300 of FIG. 131.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1200 of FIG. 12, and/or process flow 1200 of FIG. 12.

Process flow 1200 begins with 1202, and moves to operation 1204.

Operation 1204 depicts structuring and analyzing system logs of a device. In some examples, operation 1204 can be implemented in a similar manner as operation 1008 of FIG. 10.

After operation 1204, process flow 1200 moves to operation 1206.

Operation 1206 depicts, based on the analyzing, determining a probability of a failure of a part of the device. In some examples, operation 1206 can be implemented in a similar manner as operation 1010 of FIG. 10.

In some examples, the failure of the part is associated with a severity of failure. In some examples, the severity of the failure is determined to be low based on at least one system log of the system logs having a warning type or an information type. In some examples, the failure of the part is a first failure of the part, the severity of the failure is a first severity of the first failure, the system logs are first system logs, and a second severity of a second failure of the part is determined to be high based on at least one system log of second system logs having a critical type. In some examples, the first severity of the first failure corresponds to a first threshold matching rate between the system logs and a trained dataset that identifies the failure, wherein the second severity of the second failure corresponds to a second threshold matching rate between the system logs and the trained dataset that identifies the failure, and the first threshold matching rate is greater than the second threshold matching rate.

That is, a probability of system component failure can be predicted based on a match percentage, and a kind of logs present in the matching criteria. For example, the following is an example for determining a probability of a crash. In one scenario, there can be a higher match criterion relative to other scenarios (e.g., 80%), but the logs associated with the pattern are warning/information logs, so then it can be determined that a severity/criticality of component failure is low. In another scenario, there can be a lower match criterion (e.g., 50%), but the logs associated with the pattern are critical logs.

After operation 1206, process flow 1200 moves to operation 1208.

Operation 1208 depicts, based on determining that a value of the probability falls within a first range of probability values, wherein possible probability values are divided into ranges that correspond to specified actions, and wherein the ranges comprise the first range, initiating a data backup of the device to produce backed up data, determining a cause of the failure of the part, and triggering an action of the device that mitigates against the failure of the part and is based on the cause of the failure of the part. In some examples, operation 1208 can be implemented in a similar manner as operation 1012 of FIG. 10.

In some examples, the value of the probability is a first value of a first probability of a first failure of a first part, and operation 1012 comprises, based on determining that a second value of a second probability of a second failure of a second part of the device falls within a second range of probability values, where the second value of the second probability is less than the first value of the first probability, raising a warning regarding the second part. That is, a warning threshold limit can be implanted, which can be similar to warning threshold 410 of FIG. 4.

After operation 1208, process flow 1200 moves to operation 1210.

Operation 1210 depicts, after the action is performed, recovering the backed up data to the device. In some examples, operation 1210 can be implemented in a similar manner as operation 1014 of FIG. 10.

After operation 1210, process flow 1200 moves to 1212, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of cloud computing platform 102, and/or computer deployment 106.

In some examples, computing environment 1300 can implement one or more embodiments of the process flows of FIGS. 10-12 to facilitate proactive auto-correction to reduce dispatches at customer environment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
at least one processor; and
at least one memory that stores executable instructions that, when executed by the at least one processor, facilitate performance of operations, comprising:
deploying a microservice to a computer system;
collecting system logs from the computer system via the microservice, and storing the system logs in data storage of a cloud computing platform that is separate from the computer system;
instructing the cloud computing platform to structure and analyze the system logs;
based on the analyzing, determining a probability of a failure of a component of the computer system;
based on determining that a value of the probability falls within a specified range of probability values, wherein possible probability values are divided into ranges of multiple probability values that correspond to defined actions, wherein different ranges of the ranges correspond to different defined actions of the defined actions, and wherein a same defined action of the defined actions is performed for each respective probability value of the possible probability values of a respective range of the ranges, and wherein the ranges comprise the specified range, triggering a defined action of the defined actions that comprises triggering a data backup of the computer system to produce backed up data, determining a root cause of the failure of the component, and triggering a self-healing action of the computer system, wherein the self-healing action is configured to at least mitigate the failure of the component and is based on the root cause of the failure of the component; and after the self-healing action is performed, recovering the backed up data to the computer system.

2. The system of claim 1, wherein triggering the self-healing action of the computer system is performed independently of receiving user input data indicative of the triggering.

3. The system of claim 1, wherein the backed up data is recovered from the cloud computing platform and sent to the computer system.

4. The system of claim 1, wherein the microservice comprises an artificial intelligence or machine learning model that is trained on a pattern of logs within a real-time environment to produce a trained artificial intelligence or machine learning model, wherein the pattern of logs identifies a failure of the real-time environment, and wherein the trained artificial intelligence or machine learning model is configured to predict the failure over a period of time.

5. The system of claim 1, wherein the microservice is deployed to the computer system as part of deploying an operating system update to the computer system.

6. The system of claim 1, wherein the system logs comprise an application log, a security log, a setup log, or a forward event log.

7. The system of claim 1, wherein the structuring and the analyzing of the system logs is performed by an analytics engine of the cloud computing platform, and wherein the analytics engine is distributed across multiple devices of the cloud computing platform.

8. A method, comprising:
collecting, by a system comprising at least one processor, system logs from a computing device via a service deployed to the computing device, and storing the system logs in data storage of a cloud computing platform that is separate from the computing device;
instructing, by the system, the cloud computing platform to structure and analyze the system logs;
based on the analyzing, determining, by the system, a probability of a failure of a component of the computing device;
based on determining that a value of the probability falls within a first range of probability values, wherein possible probability values are divided into ranges of multiple probability values that correspond to predefined actions, wherein different ranges of the ranges correspond to different predefined actions of the predefined actions, wherein a same predefined action of the predefined actions is performed for each respective probability value of the possible probability values of a respective range of the ranges, and wherein the ranges comprise the first range,
initiating, by the system, a data backup of the computing device to produce backed up data,
determining, by the system, a cause of the failure of the component, and
triggering, by the system, an action of the computing device, wherein the action is configured to at least reduce an effect of the failure of the component and is based on the cause of the failure of the component; and
after the action is performed, recovering, by the system, the backed up data to the computing device.

9. The method of claim 8, wherein instructing the cloud computing platform to structure and analyze the system logs is iteratively and periodically performed.

10. The method of claim 8, wherein structuring the system logs comprises categorizing respective types of respective system logs of the system logs.

11. The method of claim 8, wherein analyzing the system logs comprises identifying a pattern in the system logs, and wherein determining the probability of the failure of the component of the computing device is performed based on the identifying of the pattern.

12. The method of claim 11, wherein identifying the pattern is based on a rate of matching criteria between the system logs and a trained dataset that identifies the pattern.

13. The method of claim 8, wherein analyzing the system logs is performed with a multiple linear regression model, and wherein determining the probability is performed with a time series technique.

14. The method of claim 8, wherein the system logs are first system logs, wherein analyzing the first system logs identifies respective types of the respective first system logs, and wherein determining the probability is based on an amount of matching between the first system logs and second system logs that identify a component failure that corresponds to the failure of the component and on the respective types of the respective first system logs.

15. A non-transitory computer-readable medium comprising instructions that, in response to execution, cause a system comprising at least one processor to perform operations, comprising:
structuring and analyzing system logs of a device;
based on the analyzing, determining a probability of a failure of a part of the device;
based on determining that a value of the probability falls within a first range of probability values, wherein possible probability values are divided into ranges of multiple probability values that correspond to specified actions, wherein different ranges of the ranges correspond to different specified actions of the specified actions, wherein a same specified action of the specified actions is performed for each respective probability value of the possible probability values of a respective range of the ranges, and wherein the ranges comprise the first range,
initiating a data backup of the device to produce backed up data,
determining a cause of the failure of the part, and
triggering an action of the device that mitigates against the failure of the part and is based on the cause of the failure of the part; and
after the action is performed, recovering the backed up data to the device.

16. The non-transitory computer-readable medium of claim 15, wherein the failure of the part is associated with a severity of failure.

17. The non-transitory computer-readable medium of claim 16, wherein the severity of the failure is determined to be low based on at least one system log of the system logs having a warning type or an information type.

18. The non-transitory computer-readable medium of claim 17, wherein the failure of the part is a first failure of the part, wherein the severity of the failure is a first severity of the first failure, wherein the system logs are first system logs, and wherein a second severity of a second failure of the part is determined to be high based on at least one system log of second system logs having a critical type.

19. The non-transitory computer-readable medium of claim 18, wherein the first severity of the first failure corresponds to a first threshold matching rate between the system logs and a trained dataset that identifies the failure, wherein the second severity of the second failure corresponds to a second threshold matching rate between the system logs and the trained dataset that identifies the failure, and wherein the first threshold matching rate is greater than the second threshold matching rate.

20. The non-transitory computer-readable medium of claim 15, wherein the value of the probability is a first value of a first probability of a first failure of a first part, and wherein the operations further comprise:
  based on determining that a second value of a second probability of a second failure of a second part of the device falls within a second range of probability values, wherein the second value of the second probability is less than the first value of the first probability, raising a warning regarding the second part.

* * * * *